US010587986B2

(12) United States Patent
Wu (10) Patent No.: US 10,587,986 B2
(45) Date of Patent: Mar. 10, 2020

(54) METHOD FOR LOCATING IDLE-STATE USER EQUIPMENT AND APPARATUS (71) Applicant: HUAWEI TECHNOLOGIES CO., LTD., Shenzhen, Guangdong (CN)

(72) Inventor: Jianming Wu, Guangdong (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 0 days.

(21) Appl. No.: 16/046,834

(22) Filed: Jul. 26, 2018

(65) Prior Publication Data

US 2018/0332433 A1 Nov. 15, 2018

Related U.S. Application Data (63) Continuation of application No. PCT/CN2016/084019, filed on May 31, 2016.

(51) Int. Cl.
H04W 24/02 (2009.01)
H04W 4/029 (2018.01)
H04W 68/00 (2009.01)

(52) U.S. Cl.
CPC .......... H04W 4/029 (2018.02); H04W 68/00 (2013.01); Y02D 70/00 (2018.01); Y02D 70/1242 (2018.01); Y02D 70/1262 (2018.01)

(58) Field of Classification Search
CPC ... H04W 68/00; H04W 24/02; H04W 72/042; H04W 52/0251; H04W 4/029
USPC ........................ 455/432.1, 406; 370/328, 329
See application file for complete search history.

(56) References Cited

U.S. PATENT DOCUMENTS

| 9,686,736 | B2* | 6/2017 | Baratam | ................ H04W 68/00 |
| 9,967,857 | B2* | 5/2018 | Guo | ................... H04W 52/0251 |
| 2002/0037721 | A1 | 3/2002 | Tu et al. | |
| 2008/0299955 | A1 | 12/2008 | Lee et al. | |
| 2010/0041365 | A1* | 2/2010 | Lott | ..................... G06Q 30/016 |
| | | | | 455/406 |
| 2013/0344890 | A1 | 12/2013 | Hahn et al. | |
| 2014/0092871 | A1 | 4/2014 | Wang et al. | |
| 2014/0321381 | A1* | 10/2014 | Guo | ................... H04W 52/0251 |
| | | | | 370/329 |
| 2015/0208327 | A1* | 7/2015 | Baratam | ................ H04W 68/00 |
| | | | | 455/432.1 |

(Continued)

FOREIGN PATENT DOCUMENTS

| CN | 1322101 A | 11/2001 |
| CN | 1332591 A | 1/2002 |

(Continued)

Primary Examiner — William D Cumming
(74) Attorney, Agent, or Firm — Womble Bond Dickinson (US) LLP (57) ABSTRACT A method for locating an idle-state user equipment and an apparatus are disclosed. An access network device updates a cell location identifier in a system message to a preset location identifier, and notifies, by using a paging message, idle-state UE in a cell that the system message is changed, so as to trigger the idle-state UE in the cell to read the system message and learn that the cell location identifier is updated. Therefore, the idle-state UE is triggered to initiate a location update process. The access network device locates the idle-state UE in the cell according to the location update process initiated by the idle-state UE in the cell, thereby locating the idle-state UE.

8 Claims, 3 Drawing Sheets (56) References Cited

U.S. PATENT DOCUMENTS

| | | | | |
|---|---|---|---|---|
| 2016/0044518 A1* | 2/2016 | Centonza | ............. | H04W 24/02 |
| | | | | 370/328 |
| 2017/0164249 A1 | 6/2017 | Uemura et al. | | |
| 2018/0167918 A1* | 6/2018 | Ishii | .................... | H04W 72/042 |
| 2018/0242279 A1* | 8/2018 | Guo | ................. | H04W 52/0251 |
| 2018/0332433 A1* | 11/2018 | Wu | ....................... | H04W 4/029 |

FOREIGN PATENT DOCUMENTS

| | | |
|---|---|---|
| CN | 1678094 A | 10/2005 |
| CN | 1738465 A | 2/2006 |
| CN | 101035357 A | 9/2007 |
| CN | 101043704 A | 9/2007 |
| CN | 101043710 A | 9/2007 |
| CN | 101212799 A | 7/2008 |
| CN | 101472240 A | 7/2009 |
| CN | 101547508 A | 9/2009 |
| CN | 101651891 A | 2/2010 |
| CN | 102026372 A | 4/2011 |
| CN | 102123121 A | 7/2011 |
| CN | 102149165 A | 8/2011 |
| EP | 2876948 A1 | 5/2015 |
| JP | 2009506622 A | 2/2009 |
| JP | 2011171971 A | 9/2011 |
| JP | 2016077022 A | 5/2016 |
| WO | 2014048493 A1 | 4/2014 |
| WO | 2015108976 A1 | 7/2015 |
| WO | 2016013538 A1 | 1/2016 |

* cited by examiner

METHOD FOR LOCATING IDLE-STATE USER EQUIPMENT AND APPARATUS

CROSS-REFERENCE TO RELATED APPLICATIONS

This application is a continuation of International Application No. PCT/CN2016/084019, filed on May 31, 2016, which is hereby incorporated by reference in the entireties.

TECHNICAL FIELD

Embodiments of the present disclosure relate to communications technologies, and in particular, to a method for locating idle-state user equipment (UE) and an apparatus.

BACKGROUND

In a Long Term Evolution (LTE) system, Radio Resource Control (RRC) states of UE include an idle state and a connected state. When the UE is in the connected state, the UE performs uplink and downlink data transmission with a network side. When the UE is in the idle state, there is no data exchange between the UE and the network side. Because there is no data exchange between the idle-state UE and the network side, the network side cannot detect presence of the idle-state UE. In numerous existing scenarios, presence of the idle-state UE needs to be detected. For example, in an application such as crowd statistics collection or a thermodynamic diagram, a failure in detecting idle-state UE results in incomplete user statistics collection, and an application value is greatly reduced.

SUMMARY

Embodiments of the present disclosure provide a method for locating idle-state user equipment and an apparatus, so as to locate the idle-state UE.

A first aspect of the present disclosure provides a method for locating idle-state user equipment. The method includes: An access network device sends a paging message to UE in a cell. The paging message includes read instruction information, and the read instruction information is used to instruct the UE in the cell to read a system message. Then the access network device sends the system message to the UE in the cell. A cell location identifier in the system message is a preset location identifier, and the preset location identifier is used to trigger the UE in the cell to perform a location update process. Idle-state UE in the cell initiates a location update process according to the preset location identifier. The access network device locates the idle-state UE in the cell according to the location update process initiated by the idle-state UE in the cell. In the method, the access network device updates the cell location identifier in the system message to the preset location identifier, so as to trigger the idle-state UE to initiate the location update process. The access network device can detect the idle-state UE by using the location update process initiated by the idle-state UE, thereby locating the idle-state UE.

In a possible implementation of the first aspect of the present disclosure, that the access network device locates the idle-state UE in the cell according to the location update process initiated by the idle-state UE in the cell is: The access network device determines, according to the location update process initiated by the idle-state UE, whether a cell location identifier that the idle-state UE requests to update is the preset location identifier; and when determining that the cell location identifier that the idle-state UE requests to update is the preset location identifier, the access network device obtains a temporary mobile subscriber identity of the idle-state UE, so as to determine that the idle-state UE is located in the cell.

Optionally, after obtaining the temporary mobile subscriber identity of the idle-state UE, the access network device may reject a location update operation of the idle-state UE, or may continue to perform the location update operation of the idle-state UE. The preset location identifier is added to a tracking area list of the idle-state UE by using the location update operation.

Optionally, before sending the system message, the access network device updates the cell location identifier in the system message to the preset location identifier. Optionally, the preset location identifier is a location identifier reserved in a system.

Optionally, the system message further includes a system message change identifier. The system message change identifier is used to identify that the cell location identifier in the system message is updated. Correspondingly, before sending the system message, the access network device may further update the system message change identifier in the system message. Optionally, the system message change identifier is a system information value tag in SIB1.

Optionally, the read instruction information is BCCH modification information.

A second aspect of the present disclosure provides a method for locating idle-state user equipment. The method includes: The idle-state UE receives a paging message from an access network device. The paging message includes read instruction information, and the read instruction information is used to instruct UE in a cell to read a system message. The idle-state UE receives the system message according to the read instruction information, and reads a cell location identifier in the system message. The cell location identifier in the system message is a preset location identifier. The idle-state UE initiates a location update process according to the preset location identifier, so that the access network device locates the idle-state UE according to the location update process initiated by the idle-state UE.

A third aspect of the present disclosure provides an access network device. The access network device includes a sending module and a locating module. The sending module is configured to send a paging message to UE in a cell. The paging message includes read instruction information, and the read instruction information is used to instruct the UE in the cell to read a system message. The sending module is further configured to send the system message to the UE in the cell. A cell location identifier in the system message is a preset location identifier, and the preset location identifier is used to trigger the UE in the cell to perform a location update process. The locating module is configured to locate idle-state UE in the cell according to a location update process initiated by the idle-state UE in the cell.

In a possible implementation of the third aspect, the locating module is configured to: determine, according to the location update process initiated by the idle-state UE, whether a cell location identifier that the idle-state UE requests to update is the preset location identifier; and obtain a temporary mobile subscriber identity of the idle-state UE when determining that the cell location identifier that the idle-state UE requests to update is the preset location identifier.

Optionally, the access network device further includes a location update module. The location update module is configured to reject a location update operation of the idle-state UE after the locating module obtains the temporary mobile subscriber identity of the idle-state UE.

Optionally, the access network device further includes an update module. The update module is configured to update the cell location identifier in the system message to the preset location identifier. The preset location identifier is a location identifier reserved in a system.

Optionally, the system message further includes a system message change identifier. The system message change identifier is used to identify that the cell location identifier in the system message is updated. Correspondingly, the access network device further includes an update module. The update module is configured to: update the cell location identifier in the system message to the preset location identifier, and update the system message change identifier.

Optionally, the read instruction information is BCCH modification information.

A fourth aspect of the present disclosure provides UE. The UE includes a receiving module and a location update module. The receiving module is configured to receive a paging message from an access network device. The paging message includes read instruction information, and the read instruction information is used to instruct the UE in a cell to read a system message. The receiving module is further configured to receive the system message according to the read instruction information. The location update module is configured to: read a cell location identifier in the system message, where the cell location identifier in the system message is a preset location identifier, and initiate a location update process according to the preset location identifier.

According to the method for locating idle-state user equipment and the apparatus that are provided in the embodiments of the present disclosure, an access network device updates a cell location identifier in a system message to a preset location identifier, and notifies, by using a paging message, idle-state UE in a cell that the system message is changed, so as to trigger the idle-state UE in the cell to read the system message and learn that the cell location identifier is updated. Therefore, the idle-state UE is triggered to initiate a location update process. The access network device locates the idle-state UE in the cell according to the location update process initiated by the idle-state UE in the cell, thereby locating the idle-state UE.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

An access network device used in the embodiments of the present disclosure may be a base transceiver station (BTS) in a Global System for Mobile Communications (GSM) or Code Division Multiple Access (CDMA), a NodeB (NB) in Wideband Code Division Multiple Access (WCDMA), an evolved NodeB (eNB), an access point (AP), or a relay node in an LTE network, or a base station in a next generation network (that is, a 5G network). This is not limited herein.

In addition, user equipment used in the embodiments of the present disclosure may be a wireless terminal. The wireless terminal may be a device that provides a user with voice and/or data connectivity, a handheld device with a wireless connection function, or another processing device connected to a wireless modem. The wireless terminal may communicate with at least one core network by using a radio access network (RAN). The wireless terminal may be a mobile terminal such as a mobile phone (or also referred to as a "cellular" phone), or a computer that has a mobile terminal. For example, the user equipment may be a portable, pocket-size, handheld, computer built-in, or in-vehicle mobile apparatus that exchanges voice and/or data with the radio access network. The wireless terminal may also be referred to as a subscriber unit, a subscriber station, a mobile station, a mobile station, a remote station, an access point, a remote terminal, an access terminal, a user terminal, a user agent, or user equipment. This is not limited herein.

Figure 1:
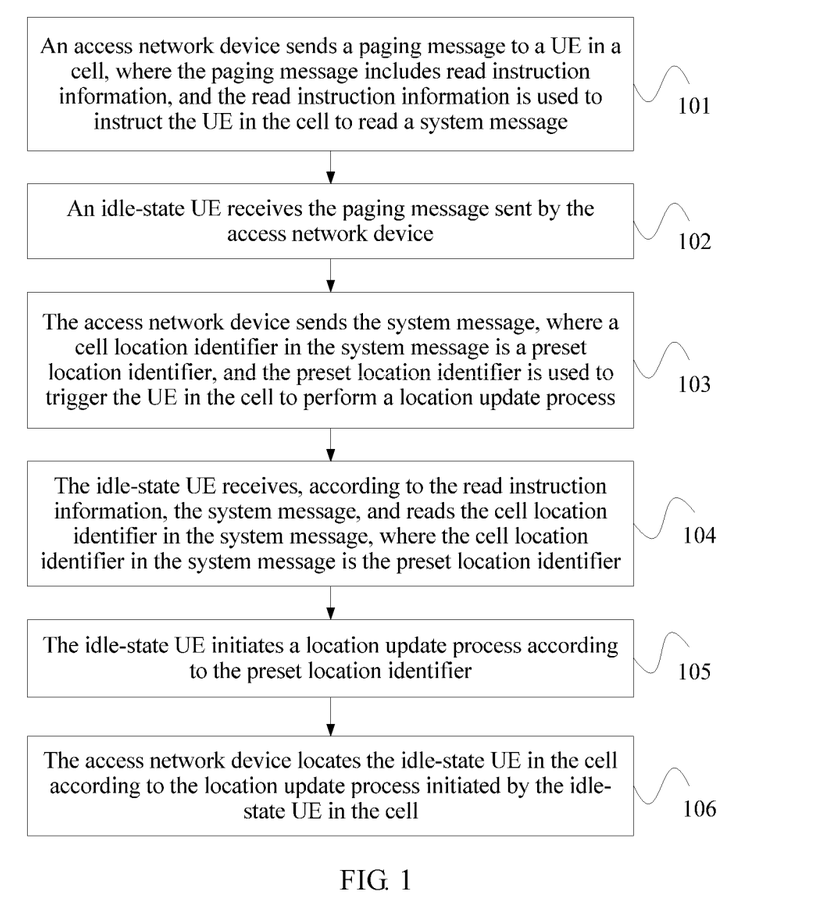
FIG. 1 is a flowchart of a method for locating idle-state user equipment according to Embodiment 1 of the present disclosure.

FIG. 1 is a flowchart of a method for locating idle-state user equipment according to Embodiment 1 of the present disclosure. As shown in FIG. 1, the method in this embodiment may include the following steps.

Step 101: An access network device sends a paging message to UE in a cell, where the paging message includes read instruction information, and the read instruction information is used to instruct the UE in the cell to read a system message.

In this embodiment, a purpose of sending the paging message by the access network device is to notify all UEs (including connected-state UE and idle-state UE) in the cell that the system message is changed. Objects paged by the access network device are all the UEs in the cell. Because the idle-state UE needs to be paged, a type of the paging message is Paging Type 1. Paging Type 1 is applied to paging for UE that is in an idle state, a CELL_PCH state, or a URA_PCH state. That is, Paging Type 1 is applicable to paging for UE that does not set up a radio link. Before sending the paging message, the access network device can obtain only identification information of the connected-state UE in the cell, and cannot obtain identification information of the idle-state UE in the cell. Therefore, when sending the paging message to the UE in the cell, the access network device does not differentiate between UEs in the cell. That is, the access network device does not send the paging message to only specific UE, and the paging message does not include identification information of to-be paged UE.

In this embodiment, the access network device adds the read instruction information to the paging message. The read instruction information is used to instruct all the UEs in the cell to read the system message. The read instruction information may be existing broadcast control channel (BCCH) modification information in a system, or may be instruction information newly defined in the present disclosure. The BCCH modification info is used as an example. If the access network device adds the BCCH modification info to the paging message, any UE that is in the idle state, the CELL_PCH (UMTS) state, or the URA_PCH (UMTS) state in the cell re-reads the system message.

A paging channel in a UMTS network, an LTE network, or the like has many paging bits. The paging bit is a bit used to indicate paging. Each UE has its own specific paging bit. UE may calculate its own paging bit in the paging channel by an IMSI of the UE, and then the UE monitors its own paging bit to learn whether the paging bit is set to 1. If the UE learns by means of the monitoring that its own paging bit is set to 1, the UE determines that the UE itself is paged. In this embodiment, a network side does not know information about the idle-state UE, that is, the network side does not know which UE needs to be paged. Therefore, the access network device sets all paging bits in the paging channel to 1, so as to page all the UEs in the cell.

Step 102: Idle-state UE receives the paging message sent by the access network device.

Both the idle-state UE and the connected-state UE in the cell receive the paging message sent by the access network device, and prepare to read the system message according to the read instruction information included in the paging message.

Step 103: The access network device sends the system message, where a cell location identifier in the system message is a preset location identifier, and the preset location identifier is used to trigger the UE in the cell to perform a location update process.

The access network device broadcasts the system message in the cell, to notify the UE in the cell of public information of a network access stratum and a non-access stratum, so that the UE learns a configuration status of a network before initiating a call. The system message is usually broadcast periodically. The UE reads the system message before accessing the cell. After the UE accesses the cell, generally, the UE does not actively read the system message. Therefore, in this embodiment, the access network device triggers, by sending the paging message, the UE in the cell to actively read the system message.

In this embodiment, before sending the system message, the access network device modifies the system message. The system message includes one master information block (MIB) and multiple system information blocks (SIB). The MIB includes basic physical layer information of the cell. SIB1 includes information related to cell selection and scheduling information of other SIBs. Content of the other SIBs is not described herein. In this embodiment, the access network device updates the cell location identifier in the SIB1 in the system message to the preset location identifier. The preset location identifier is used to trigger the UE to perform the location update process. The UE performs the location update process once reading the preset location identifier. The preset location identifier may be a location identifier reserved in the system. The reserved location identifier is for a special use, and the reserved location identifier is not used in normal paging. Alternatively, the preset location identifier may be a location identifier newly defined in the present disclosure.

In this embodiment, the cell location identifier in the system message is updated to the preset location identifier to trigger the idle-state UE to perform the location update process, so that the access network device can locate the idle-state UE according to the location update process. Actually, a location of the UE is not changed. Normally, if the location of the UE is not changed, the cell location identifier saved by the UE and the cell location identifier in the system message are the same, and the UE does not perform the location update process.

It should be noted that, in this embodiment, locating the idle-state UE by the access network device is that the access network device detects whether UE is in a cell in which the access network device is located, but does not detect a specific location of the UE.

In an LTE system, the cell location identifier is a tracking area code (TAC), and the preset location identifier may be a TAC reserved in the system. The TAC is used to identify a tracking area. One tracking area may cover one or multiple cells. The tracking area is an area used for paging and location update.

In the UMTS, the cell location identifier is a location area code (LAC), and the preset location identifier may be an LAC reserved in the system. The LAC can uniquely identify each location area in a digital public land mobile network (PLMN). The LAC is a 2-byte hexadecimal binary coded decimal (BCD) code, and is expressed as L1L2L3L4 (a range is from 0000 to FFFF, and 65536 different area locations can be defined). The LAC is sent in a system message on a broadcast channel of each cell. When a mobile station is powered on, has a subscriber identity module (SIM) card inserted, or finds that an LAC of a current cell is different from originally saved content of the mobile station, the mobile station advertises its current location area to a network by using an international mobile subscriber identity (IMSI) attach (IMSI Attach) or a location update process. The network stores a location area of each UE, and uses the location area as location information for paging the UE in the future.

Optionally, the system message further includes a system message change identifier. The system message change identifier is used to identify that the cell location identifier in the system message is updated. When receiving the system message, the UE first reads the system message change identifier, and then determines, according to the system message change identifier, whether the system message is updated. If the system message is updated, the UE further reads content of each SIB in the system message. If the system message is not updated, the UE does not read the content of each SIB in the system message.

Optionally, the system message change identifier may be a system information value tag (systemInfoValueTag) in SIB1. A value of systemInfoValueTag ranges from 0 to 31. The value of systemInfoValueTag is increased by 1 each time the system message is changed. After receiving the system message, the UE reads the systemInfoValueTag from the SIB1, and compares the value of systemInfoValueTag in the system message with a value of systemInfoValueTag stored by the UE. If the value of systemInfoValueTag in the system message is different from the value of systemInfoValueTag stored by the UE, it indicates that the system message is changed, and the UE needs to re-read the content of the other SIBs. If the value of systemInfoValueTag in the system message and the value of systemInfoValueTag stored by the UE are the same, it indicates that the system message is not changed, and the UE does not need to read the content of the other SIBs. Certainly, the system message change identifier may also be an identifier newly defined in the present disclosure.

Step 104: The idle-state UE receives the system message according to the read instruction information, and reads the cell location identifier in the system message, where the cell location identifier in the system message is the preset location identifier.

Step 105: The idle-state UE initiates a location update process according to the preset location identifier.

After receiving the system message, if the idle-state UE learns that the cell location identifier included in the system message is updated to the preset location identifier, the UE initiates the location update process. After receiving the system message, if the connected-state UE learns that the cell location identifier included in the system message is updated to the preset location identifier, the connected-state UE may initiate the location update process, or may not initiate the location update process.

Step 106: The access network device locates the idle-state UE in the cell according to the location update process initiated by the idle-state UE in the cell.

After the idle-state UE initiates the location update process, the access network device detects the location update process initiated by the idle-state UE, obtains, according to the location update process initiated by the idle-state UE, a temporary mobile subscriber identity (TMSI) of the idle-state UE, and further determines which UE initiates the location update process, thereby detecting presence of the idle-state UE. The access network device may further obtain received signal strength and the like of the idle-state UE according to the location update process initiated by the idle-state UE. After obtaining the TMSI of the idle-state UE, the access network device may further determine whether a cell location identifier that the idle-state UE requests to update is the preset location identifier. When determining that the cell location identifier that the idle-state UE requests to update is the preset location identifier, the access network device may reject a location update operation of the idle-state UE. Because the access network device rejects the location update operation of the idle-state UE, a location of the idle-state UE is not updated. The preset location identifier is not added to a tracking area list of the idle-state UE. When the idle-state UE is paged subsequently, the preset location identifier does not exist in the tracking area list of the idle-state UE, and the access network device does not page the UE according to the preset location identifier. Because the preset location identifier is not a location identifier of a cell, when paging the idle-state UE according to the preset location identifier, the access network device cannot page the idle-state UE. This may cause a paging resource waste. In this embodiment, rejecting a location update operation avoids a subsequent problem of a paging resource waste caused by invalid paging.

Optionally, when the access network device determines that the cell location identifier that the idle-state UE requests to update is the preset location identifier, the access network device may continue to perform the location update process, and the access network device adds the preset location identifier to the tracking area list of the idle-state UE. This manner does not affect normal paging for the UE, but may cause a paging resource waste.

In this embodiment, if the connected-state UE also initiates a location update process, by using a method same as that of the idle-state UE, the access network device may reject the location update process of the connected-state UE, or perform a normal location update process.

In this embodiment, in the location update process, the access network device detects the presence of the idle-state UE by obtaining the TMSI, received signal strength, and the like of the idle-state UE, that is, detects that the idle-state UE is located in the cell in which the access network device performs paging. After locating the idle-state UE, the access network device may send information about the UE to a service anchor (SVA). The SVA performs the following operations according to the information about the idle-state UE:

(1) counting a user quantity in a cell: In a specific indoor or outdoor area, all users covered by a cell needs to be counted. By using an existing method, only the connected-state UE can be located, and the idle-state UE cannot be located. Consequently, the user quantity in the cell cannot be counted accurately. By using the method in this embodiment of the present disclosure, a base station can locate the idle-state UE, and the SVA can accurately count the user quantity in the cell (including the idle-state UE and the connected-state UE);

(2) warning about an intrusion into a restricted area: When a user carrying a mobile phone intrudes into a specific restricted area, and the mobile phone is in an idle state, presence of the idle-state mobile phone cannot be perceived by using the existing method. By using the method in this embodiment, the base station can detect the presence of the idle-state UE, and report to the SVA, so that the SVA sends warning information to the idle-state UE; and (3) energy saving: The base station needs to detect whether there is a user in a cell, to facilitate shutdown of indoor coverage facilities, and achieve a purpose of power saving. In the prior art, if there is no connected-state UE in a cell, and there is only idle-state UE, because the base station cannot detect the idle-state UE, the base station considers that there is no user in the cell, and then shuts down the indoor coverage facilities. If the idle-state UE requires communication subsequently, the UE cannot perform communication because the base station shuts down the indoor coverage facilities. Consequently, normal use of a user is affected. By using the method in this embodiment of the present disclosure, the base station can detect the presence of the idle-state UE, and report to the SVA, so that the SVA determines whether to shut down the indoor coverage facilities.

In this embodiment, an access network device updates a cell location identifier in a system message to a preset location identifier, and notifies, by using a paging message, UE in a cell that the system message is changed, so as to trigger the UE in the cell to read the system message and learn that the cell location identifier is updated. Therefore, idle-state UE is triggered to initiate a location update process. The access network device locates the idle-state UE in the cell according to the location update process initiated by the idle-state UE in the cell, thereby locating the idle-state UE.

Figure 2:
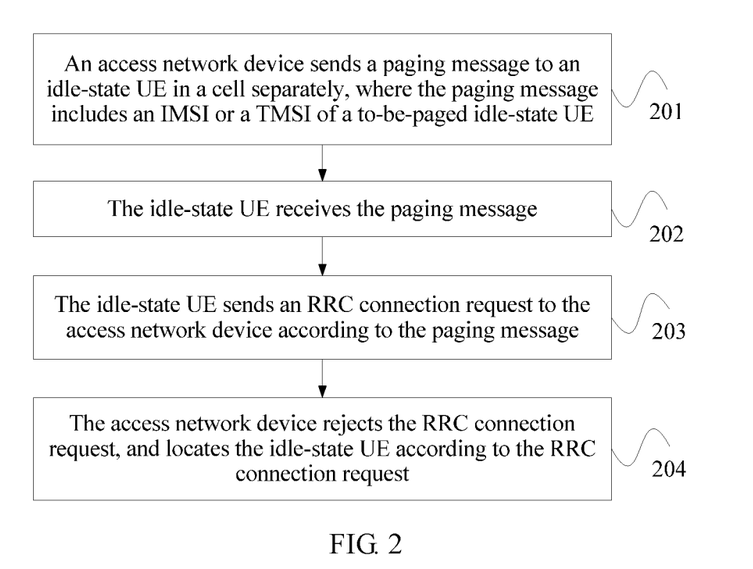
FIG. 2 is a flowchart of a method for locating idle-state user equipment according to Embodiment 2 of the present disclosure.

FIG. 2 is a flowchart of a method for locating idle-state user equipment according to Embodiment 2 of the present disclosure. As shown in FIG. 2, the method in this embodiment may include the following steps:

Step 201: An access network device sends a paging message to idle-state UE in a cell separately, where the paging message includes a subscriber identity of to-be-paged idle-state UE.

Step 202: The idle-state UE receives the paging message.

Step 203: The idle-state UE sends an RRC connection setup request to the access network device according to the paging message.

Step 204: The access network device rejects the RRC connection setup request, and locates the idle-state UE according to the RRC connection setup request.

A premise of this embodiment is that the access network device needs to obtain the subscriber identity of the to-be-paged idle-state UE. The subscriber identity may be an IMSI or a TMSI of the idle-state UE. The access network device may obtain only a subscriber identity of UE that is switched from a connected state to an idle state. For UE that moves to the cell but does not access the cell, the access network device cannot obtain a subscriber identity of the UE, and cannot initiate paging for the UE.

In an existing mechanism, when UE in the cell is switched from the connected state to the idle state, an MME does not delete information about the UE immediately, but saves the information about the UE for a period of time. Therefore, the access network device may obtain the subscriber identity of the idle-state UE in the cell from the MME. The idle-state UE may still camp on the cell, or may leave the cell.

For idle-state UE that has left the cell, after the access network device sends the paging message, the idle-state UE cannot receive the paging message, and cannot trigger a subsequent RRC connection setup process.

For idle-state UE that still camps on the cell, after the access network device sends the paging message to the idle-state UE, the idle-state UE receives the paging message, determines, according to a subscriber identity carried in the paging message, that the idle-state UE itself is paged, and enters a normal access process. That is, the idle-state UE initiates the RRC connection setup process. For the idle-state UE, because the access network device does not need to send downlink data to the idle-state UE at this time, if an RRC connection is set up for the idle-state UE, a radio resource waste is caused. Therefore, the access network device may reject the RRC connection setup process initiated by the idle-state UE, so as to avoid the radio resource waste.

For the idle-state UE that moves to the cell but does not access the cell, because the idle-state UE has never accessed the cell, the access network device cannot obtain the subscriber identity of the idle-state UE, and cannot page the idle-state UE.

Figure 3:
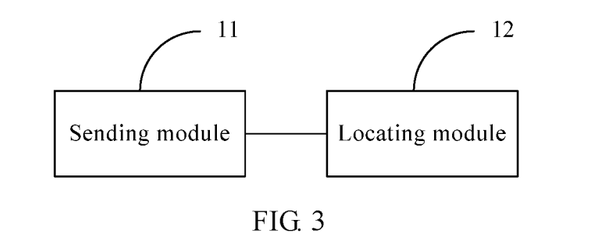
FIG. 3 is a schematic structural diagram of an access network device according to Embodiment 3 of the present disclosure.

FIG. 3 is a schematic structural diagram of an access network device according to Embodiment 3 of the present disclosure. As shown in FIG. 3, the access network device provided in this embodiment includes: a sending module 11 and a locating module 12.

The sending module 11 is configured to send a paging message to UE in a cell, where the paging message includes read instruction information, and the read instruction information is used to instruct the UE in the cell to read a system message. The sending module 11 is further configured to send the system message to the UE in the cell, where a cell location identifier in the system message is a preset location identifier, and the preset location identifier is used to trigger the UE in the cell to perform a location update process.

The locating module 12 is configured to locate idle-state UE in the cell according to a location update process initiated by the idle-state UE in the cell.

Optionally, the read instruction information is BCCH modification information.

Optionally, the access network device further includes an update module. The update module is configured to update the cell location identifier in the system message to the preset location identifier.

Optionally, the system message further includes a system message change identifier. The system message change identifier is used to identify that the cell location identifier in the system message is updated. Correspondingly, the update module is further configured to update the system message change identifier in the system message. Optionally, the system message change identifier is a system information value tag in SIB 1.

Optionally, the preset location identifier is a location identifier reserved in a system.

Optionally, the locating module 12 is configured to: determine, according to the location update process initiated by the idle-state UE, whether a cell location identifier that the idle-state UE requests to update is the preset location identifier; and when the cell location update identifier that the idle-state UE requests to update is the preset location identifier, obtain a temporary mobile subscriber identity of the idle-state UE.

Optionally, the access network device further includes a location update module. The location update module is configured to reject a location update operation of the idle-state UE.

According to the access network device in this embodiment, function modules of the access network device may be configured to perform the method in Embodiment 1. A specific implementation and technical effect are similar to those of the method in Embodiment 1, and details are not described herein again.

Figure 4:
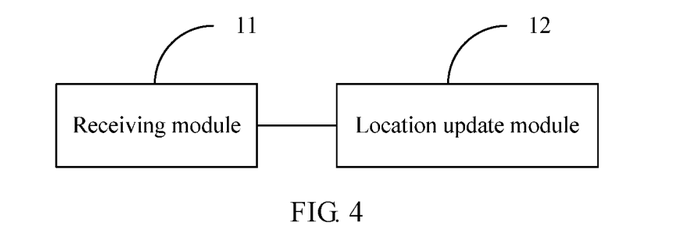
FIG. 4 is a schematic structural diagram of UE according to Embodiment 4 of the present disclosure.

FIG. 4 is a schematic structural diagram of UE according to Embodiment 4 of the present disclosure. As shown in FIG. 4, the UE provided in this embodiment includes: a receiving module 21 and a location update module 22.

The receiving module 21 is configured to receive a paging message from an access network device, where the paging message includes read instruction information, and the read instruction information is used to instruct UE in a cell to read a system message. The receiving module 21 is further configured to receive the system message according to the read instruction information.

The location update module 22 is configured to: read a cell location identifier in the system message, where the cell location identifier in the system message is a preset location identifier, and initiate a location update process according to the preset location identifier.

Optionally, the preset location identifier is a location identifier reserved in a system. The read instruction information is BCCH modification information.

Optionally, the system message further includes a system message change identifier. The system message change identifier is used to identify that the cell location identifier in the system message is updated. Optionally, the system message change identifier is a system information value tag in SIB 1.

According to the UE in this embodiment, function modules of the UE may be configured to perform the method in Embodiment 1. A specific implementation and technical effect are similar to those of the method in Embodiment 1, and details are not described herein again.

Figure 5:
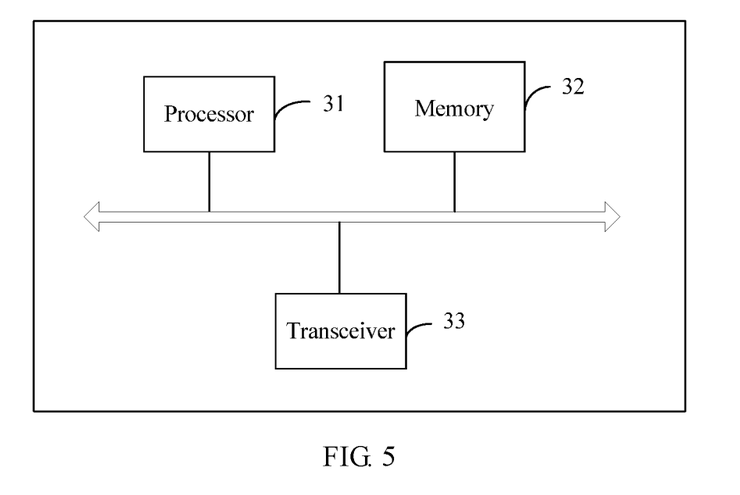
FIG. 5 is a schematic structural diagram of an access network device according to Embodiment 5 of the present disclosure.

FIG. 5 is a schematic structural diagram of an access network device according to Embodiment 5 of the present disclosure. As shown in FIG. 5, the access network device provided in this embodiment includes a processor 31, a memory 32, and a transceiver 33. The memory 32 and the transceiver 33 may connect to and communicate with the processor 31 by using a bus. The memory 32 is configured to store a computer program. The transceiver 33 is configured to receive and send data. The processor 31 is configured to execute the program stored in the memory 32, so as to process data. The access network device in this embodiment may be configured to perform the method of the foregoing Embodiment 1.

Figure 6:
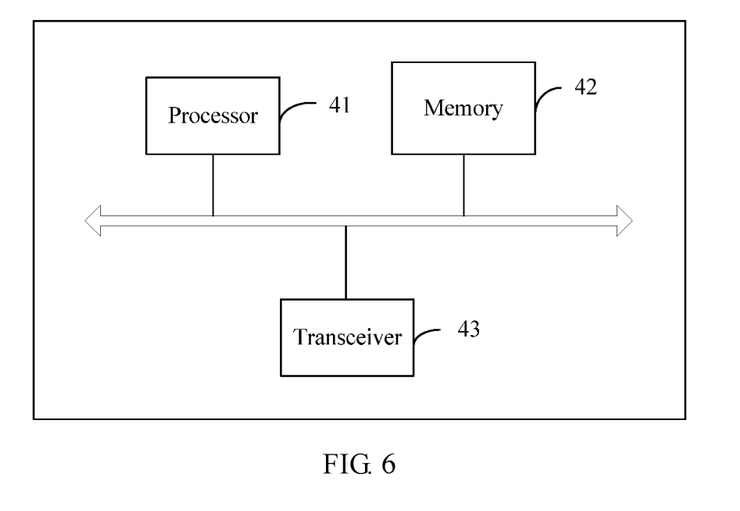
FIG. 6 is a schematic structural diagram of UE according to Embodiment 6 of the present disclosure.

FIG. 6 is a schematic structural diagram of UE according to Embodiment 6 of the present disclosure. As shown in FIG. 6, the UE provided in this embodiment includes a processor 41, a memory 42, and a transceiver 43. The memory 42 and the transceiver 43 may connect to and communicate with the processor 41 by using a bus. The memory 42 is configured to store a computer program. The transceiver 43 is configured to receive and send data. The processor 41 is configured to execute the program stored in the memory 42, so as to process data. The UE in this embodiment may be configured to perform the method of the foregoing Embodiment 1.

In the embodiments shown in FIG. 5 and FIG. 6, a processor may be a general central processing unit, an application specific integrated circuit (ASIC), one or more integrated circuits that are used to control program execution, a hardware circuit developed by using a field programmable gate array (FPGA), or a baseband processor. A memory may include one or more of a read-only memory (ROM), a random access memory (RAM), or a magnetic disk storage. The memory is configured to store data and/or an instruction required for running the processor. There may be one or more memories.

Persons of ordinary skill in the art may understand that all or some of the steps of the method embodiments may be implemented by a program instructing relevant hardware. The foregoing program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for locating an idle-state user equipment (UE), comprising:
   receiving, by the idle-state user equipment UE, a paging message from an access network device, wherein the paging message comprises read instruction information, and the read instruction information is used to instruct UE in a cell to read a system message;
   receiving, by the idle-state UE according to the read instruction information, the system message, and reading a cell location identifier in the system message, wherein the cell location identifier in the system message is a preset location identifier, and wherein the preset location identifier is a location identifier reserved in a system; and
   initiating, by the idle-state UE, a location update process according to the preset location identifier.

2. The method according to claim 1, wherein the system message further comprises: a system message change identifier, and the system message change identifier is used to identify that the cell location identifier in the system message is updated.

3. The method according to claim 1, wherein the read instruction information is broadcast control channel (BCCH) modification information.

4. The method according to claim 2, wherein the system message change identifier is a system information value tag in a system information block (SIB) SIB1.

5. A user equipment (UE), comprising:
   a transceiver, configured to receive a paging message from an access network device, wherein the paging message comprises read instruction information, and the read instruction information is used to instruct the UE in a cell to read a system message; and to receive the system message according to the read instruction information; and
   a processor, configured to: read a cell location identifier in the system message, wherein the cell location identifier in the system message is a preset location identifier, and wherein the preset location identifier is a location identifier reserved in a system, and initiate a location update process according to the preset location identifier.

6. The UE according to claim 5, wherein the system message further comprises: a system message change identifier, and the system message change identifier is used to identify that the cell location identifier in the system message is updated.

7. The UE according to claim 5, wherein the read instruction information is broadcast control channel (BCCH) modification information.

8. The UE according to claim 5, wherein the system message change identifier is a system information value tag in a system information block (SIB) SIB 1.

* * * * *